United States Patent
Yerradoddi et al.

(10) Patent No.: US 10,963,885 B2
(45) Date of Patent: Mar. 30, 2021

(54) SYSTEMS AND METHODS FOR USING MACHINE LEARNING TO PREDICT EVENTS ASSOCIATED WITH TRANSACTIONS

(71) Applicant: PAYPAL, INC., San Jose, CA (US)

(72) Inventors: Chengal Yerradoddi, Austin, TX (US); Phanendra Mallampalli, Leander, TX (US); Abhishek Hodavdekar, Austin, TX (US)

(73) Assignee: PayPal, Inc., San Jose, CA (US)

( * ) Notice: Subject to any disclaimer, the term of this patent is extended or adjusted under 35 U.S.C. 154(b) by 176 days.

(21) Appl. No.: 16/375,779

(22) Filed: Apr. 4, 2019

(65) Prior Publication Data
US 2020/0320534 A1 Oct. 8, 2020

(51) Int. Cl.
| | |
|---|---|
| *G06Q 20/40* | (2012.01) |
| *G06F 11/34* | (2006.01) |
| *G06N 20/00* | (2019.01) |
| *G06Q 10/08* | (2012.01) |

(52) U.S. Cl.
CPC ....... *G06Q 20/407* (2013.01); *G06F 11/3438* (2013.01); *G06N 20/00* (2019.01); *G06Q 10/0833* (2013.01)

(58) Field of Classification Search
None
See application file for complete search history.

(56) References Cited

U.S. PATENT DOCUMENTS

| | | | |
|---|---|---|---|
| 2017/0178134 A1* | 6/2017 | Senci | G06Q 20/407 |
| 2018/0060839 A1* | 3/2018 | Murali | G06Q 20/4016 |
| 2019/0164159 A1* | 5/2019 | Ponniah | G06Q 20/407 |
| 2020/0134628 A1* | 4/2020 | Jia | G06N 20/00 |

OTHER PUBLICATIONS

Dutree et al.; "Detecting Fraud in Financial Payments" Stanford University, Dec. 15, 2017, 8 pages.
"Machine Learning for Fraud Models"; https://prosupport.whitepages.com; 5 pages.
Kijek, Aleksander; "A Beginner's Guide to Machine Learning in Payment Fraud Detection & Prevention"; Aug. 18, 2017; Solutions Case Studies Integration; 10 pages.
Wei, Zonghui; "Pool Protector: Leveraging network analysis to prevent payment fraud"; Feb. 5, 2018, 7 pages.

* cited by examiner

*Primary Examiner* — Namrata Boveja
*Assistant Examiner* — William D Newlon
(74) *Attorney, Agent, or Firm* — Haynes and Boone LLP

(57) ABSTRACT

Methods and systems are presented for predicting a likelihood of an occurrence of an event, such as a dispute or a chargeback, associated with an electronic transaction based on monitoring user interactions of a user with one or more computing systems after the electronic transaction has been conducted. The electronic transaction may involve a purchase of a product and/or service from a merchant. After the transaction is conducted, user interactions of the user with the one or more computer systems, such as a website of the merchant involved in the transaction, a website of another merchant, and a website of a payment service provider may be monitored. A machine learning model may then be used to predict whether the event associated with the transaction will occur in the future based on the monitored user interactions.

20 Claims, 7 Drawing Sheets

US 10,963,885 B2

SYSTEMS AND METHODS FOR USING MACHINE LEARNING TO PREDICT EVENTS ASSOCIATED WITH TRANSACTIONS

BACKGROUND

The present specification generally relates to using machine learning for events prediction, and more specifically, to using a machine learning model to predict an occurrence of an event based on monitoring user interactions with one or more computer systems according to various embodiments of the disclosure.

RELATED ART

With the advent of computing systems (especially mobile computing systems) and the connectivity among the computing systems, it is easier and more popular than ever for consumers to conduct electronic transactions online. However, the ease of conducting electronic transactions online also create problems with merchants and/or service providers that facilitate the electronic transactions. For example, due to the fact that an electronic transaction may be disputed within a period of time after the transaction has occurred, the amount that is charged for the transaction may be held (e.g., by a payment service provider) for a duration before being released to the merchant. Furthermore, the consumer may subsequently dispute the transaction due to a number of reasons, such as a wrong amount being charged, unsatisfied of the product received, shipment issues, etc. Based on the dispute, a chargeback event may occur where the amount associated with the transaction is charged back from an account of the merchant to an account of the consumer, resulting in monetary loss for the merchant.

It would be beneficial for the merchants and/or the service providers to know that a chargeback event associated with a transaction may occur such that remedial actions may be performed to avoid such an event. Thus, there is a need for providing a machine learning model that predicts an occurrence of an event, such as a chargeback event, related to an electronic transaction.

Figure 1:
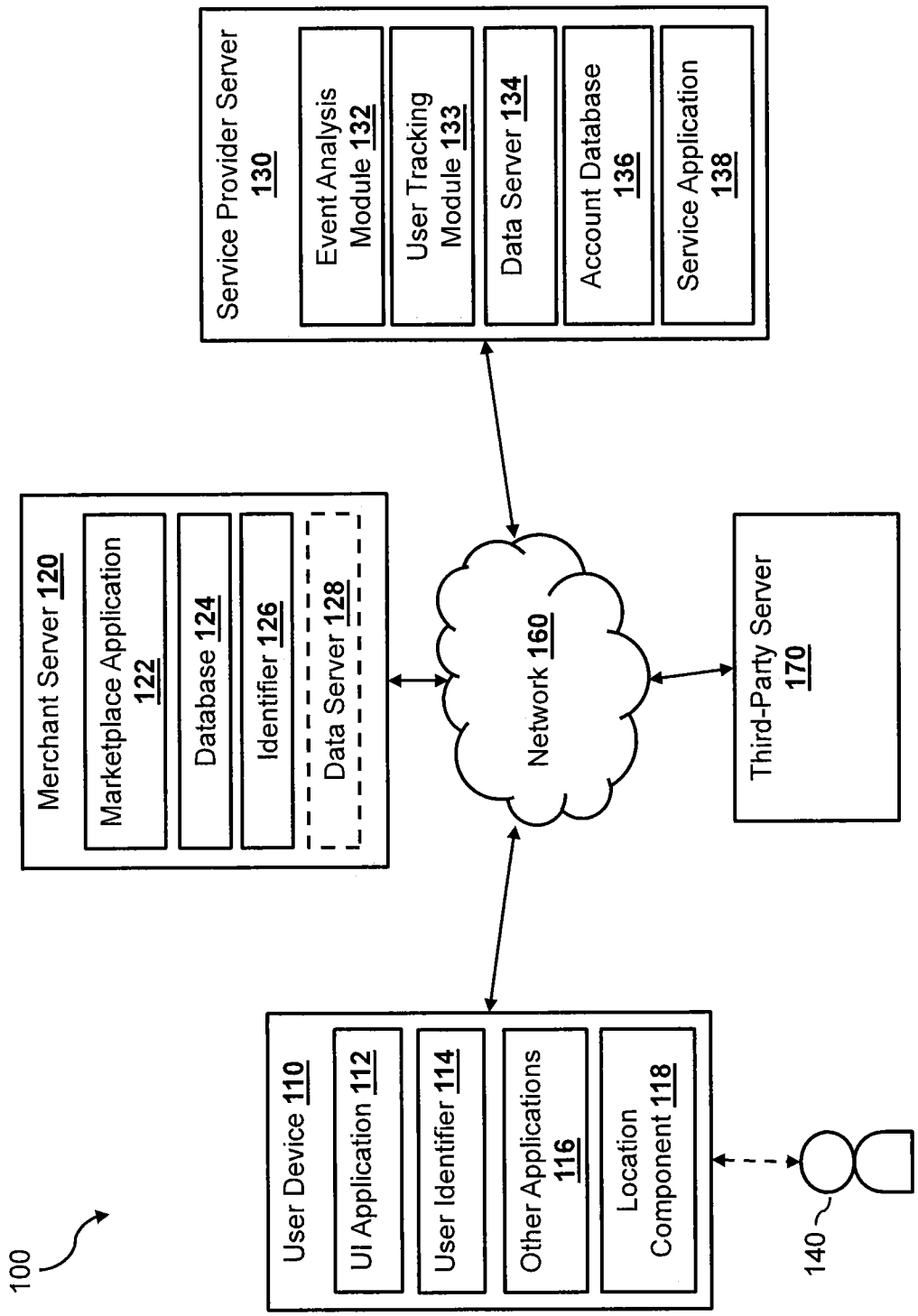
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for predicting a likelihood of an occurrence of an event associated with an electronic transaction based on monitoring user interactions of a user with one or more computing systems after the electronic transaction has been conducted. The electronic transaction may involve a purchase of a product and/or service from a merchant. In a typical purchase transaction, a user (e.g., a consumer) may initiate the purchase transaction by interacting with a merchant (e.g., via a website of the merchant, an application associated with the merchant, or a point-of-sale (POS) device of the merchant). The consumer may provide funding source information (e.g., a credit card number, a debit card number, etc.) to the merchant. In some embodiments, the consumer may provide a payment for the purchase transaction through a payment service provider, such as PayPal®, Inc., of San Jose, Calif., USA. As such, the payment service provider may facilitate and/or process the payment for the purchase transaction. The merchant and/or the payment service provider may initiate a payment transaction related to the purchase, for example, by transmitting a payment request including the funding source information and an amount to be charged to an acquiring bank. The acquiring bank may then transmit the funding source information and the amount to be charged to an issuing bank, which may then settle the payment by sending funds in the amount to the merchant via the acquiring bank. The entire settlement cycle, from the initiation of the payment transaction to the settlement of the funds, may take up to a period of time (e.g., several hours, several days, etc.).

As discussed above, a consumer associated with an electronic transaction with a merchant may subsequently dispute the transaction, which may trigger an event, such as a dispute event or a chargeback event. The event may occur during the settlement cycle (e.g., before the settlement of funds) or after the settlement cycle. In order to alleviate the risk of losing money in a disputed transaction, when the payment transaction is performed through the payment service provider, the payment service provider may hold the amount of the transaction from the merchant until the fund is settled. Due to the large volume of transaction that a payment service provider has to process, the payment service provider may have a large number of payment holds (e.g., 10 million, etc.) at any given point in time, in an amount of up to hundreds of millions of dollars. Holding the funds from the merchants can be detrimental to the merchants, as they cannot make use of the funds even after the item has been shipped off. One approach to alleviate this problem is to, instead of holding funds associated with all transactions, hold only the funds associated with high risk transactions. A high risk transaction is one that has a high likelihood of having a dispute event or a chargeback event (e.g., the likelihood that an event such as a dispute event or a chargeback event will occur for the transaction exceeds a predetermined threshold). In addition, once the high risk transactions are identified, remedial actions may be performed to reduce the likelihood of such a future event (e.g., a dispute and/or chargeback).

Thus, according to various embodiments of the disclosure, an event analysis system may use a machine learning model to predict whether an event (e.g., a dispute event, a chargeback event, etc.) associated with a transaction will occur in the future. Specifically, the machine learning model may be trained and configured to determine, for a particular electronic transaction, a likelihood that the event associated with the particular electronic transaction will occur in the future. The event analysis system may use the machine learning model to determine such a likelihood based on a number of factors. For example, the event analysis system may use the machine learning model to determine such a likelihood based on information related to the transaction. Thus, in some embodiments, when the event analysis system receives an indication that an electronic transaction has occurred, the event analysis system may obtain the information related to the transaction. The information related to the transaction may include a date and time of the transaction, a location where the transaction took place, an amount associated with the transaction, an identity of a merchant associated with the transaction, a rate that an event occurred for historic transactions associated with the merchant, an identity of a consumer associated with the transaction, a rate that an event occurred for historic transactions associated with the consumer, a category of the item being purchased in the transaction, a funding source type for the transaction, and other data related to the transaction.

When the electronic transaction is conducted online (e.g., via the merchant website, via an application such as a mobile application associated with the merchant, etc.), the transaction may involve a shipment of one or more item. Issues related to the shipment may be one of the causes for triggering the event associated with the transactions. As such, the event analysis system may also obtain information related to the shipment, such as a shipment creation date, a courier used for the shipment, a shipment type (e.g., by air, by ground, etc.), an origin of the shipment, and other information related to the shipment. In some embodiments, the machine learning model may also use the information related to the shipment to determine the likelihood of an event associated with the transaction.

Fraudulent transactions may also be a cause for triggering the event associated with the transactions. A legitimate user may, after a fraudulent transaction has been conducted, realize that the user has never conducted such a transaction and initiate a dispute over the transaction. As such, the event analysis system of some embodiments may also obtain device data associated with a user device used by the consumer for conducting the transaction. For example, the event analysis system may obtain an Internet Protocol (IP) address of the device, a geographical location of the user device, and a language used to conduct the transaction, and may determine whether the language used to conduct the transaction and the IP address correspond to the geographical location of the user device. The event analysis system may also use the machine learning model to determine the likelihood of an event associated with the transaction further based on the device data obtained from the user device of the consumer.

User interactions with one or more computing systems, such as the merchant's website, the merchant's application, a website of the payment service provider, the payment service provider's application, and/or other third-party interfaces may also be an indication for triggering the event associated with a transaction. For example, the consumer visiting a "frequently asked question" page of the merchant's interface (on the merchant's website or the merchant's application, etc.), visiting a transaction detail page associated with the transaction on the merchant's interface, or conducting an online chat session within the merchant via the merchant's interface shortly after conducting the transaction may indicate a higher likelihood that the user may file a dispute with respect to the transaction. As such, in some embodiments, the event analysis system may also monitor user interaction of the consumer with the merchant website after the transaction has occurred, and may obtain interaction data such as which electronic page within the merchant's interface (e.g., the merchant's website, the merchant's application, etc.) the consumer has visited, the duration of the visit, the consumer's interactions with the electronic page (e.g., which links the consumer has clicked on, whether the consumer has engaged in an online chat session at the merchant's interface, etc.), and other user interaction with the merchant's interface.

User interactions of the consumer with other interfaces (e.g., interfaces of other merchants, a Best Business Bureau website, etc.) may also indicate a higher likelihood of the event. The user interactions may include one or more specific electronic pages visited by the consumer within an interface, a duration of the visit by the consumer, one or more links that the consumer selected within the pages, one or more portions of the pages viewed by the consumer, any application within the pages (e.g., an online chat application, a plug-in, etc.) initiated by the consumer, etc. For example, the consumer visiting interfaces (e.g., webpages, mobile applications, etc.) of other merchants selling the same or similar item as the item associated with the transaction or the consumer visiting an interface (e.g., a website) for rating merchants may indicate a higher likelihood that an event, such as a dispute or a chargeback may take place associated with the transaction. In some embodiments, the event analysis system may monitor interactions of the consumer with the other interfaces subsequent to conducting the transaction, and may obtain interaction data such as which interface the consumer has visited, the duration of the visit, has the consumer engage in an online chat session at that interface, and other user interactions.

Furthermore, user interactions of the consumer with the interface (e.g., the website, the mobile application, etc.) of the payment service provider may also indicate a higher likelihood of the event. For example, the consumer visiting a "frequently asked question" page of the payment service transaction interface, visiting a transaction detail page associated with the transaction on the payment service transaction interface, or conducting an online chat session within the interface of the payment service provider shortly after conducting the transaction may indicate a higher likelihood that the user may file a dispute with respect to the transaction. As such, the event analysis system may also monitor user interactions of the consumer with the interface of the payment service provider subsequent to the transaction, and may obtain interaction data such as which electronic page within the payment service provider interface the consumer has visited, the duration of the visit, has the consumer engage in an online chat session at the payment service provider interface, and other user interactions with the payment service provider interface.

In some embodiments, the event analysis system may continue to monitor the user interactions of the consumer with the one or more computing systems (e.g., the merchant website, the merchant's application, websites of other merchants, applications of other merchants, websites that rate merchants, the website of the payment service provider, a mobile application of the payment service provider, etc.) after the transaction has been conducted for a predetermined period of time (e.g., 24 hours, 3 days, 6 days, etc.) and/or until a termination condition (e.g., the settlement of the payment, etc.) is detected. The event analysis system may use the machine learning model to determine a likelihood that an event (e.g., a dispute event, a chargeback event, etc.) will occur at any time (e.g., while the user interactions are being monitored, during the settlement cycle, after the transaction has been settled, etc.) based on the monitored user interactions and other information (e.g., the transaction information, shipment information, device information, etc.). In some embodiments, the event analysis system may use the machine learning model to determine such a likelihood in real time such that the machine learning model may take into account any user interactions occurred prior to running the machine learning model.

The even analysis system may also generate and present a report, for a particular merchant, a summary of the transactions associated with the particular merchant and the likelihood that the event associated with each transaction will occur. In some embodiments, the event analysis system may also present options for the merchant to select regarding one or more remedial actions to perform based on the determined likelihood. For example, the options may include "creation of a shipment" for a transaction if it is determined that a shipment has not been created for such a transaction. When such an option is selected, the event analysis system may automatically direct the merchant to a courier's interface for creating a shipment for the transaction. The options may also include "contacting the consumer" associated with the transaction. When such an option is selected, the event analysis system may automatically direct the merchant to an interface for generating and transmitting a message to the consumer. The options may also include "providing a refund" to the consumer associated with the transaction. The option may be selected by the merchant, for example, when the merchant determines that the item associated with the transaction may no longer be fulfilled or the transaction is a fraudulent transaction. When such an option is selected, the event analysis system may initiate a refund transaction associated with the payment. The options may also include "updating shipment status" for the transaction. When such an option is selected, the event analysis system may obtain updated shipment information associated with the transaction, for example, from a courier used by the merchant, and may automatically transmit the updated shipment information (e.g., a shipment status) to the consumer without requiring any action from the consumer. These actions may be considered remedial actions as performing one or more of these actions for the transaction may prevent the event from occurring.

In some embodiments, the event analysis system may perform one or more of the remedial actions without requiring any input from the merchant. For example, the event analysis system may perform one or more of the remedial actions based on the determined likelihood of the event associated with the transaction. When it is determined that the likelihood exceeds a predetermined threshold, the event analysis system of some embodiments may automatically select one or more of the remedial actions and perform the selected one or more of the remedial actions (e.g., obtaining a shipment status and transmitting the shipment status to the consumer, etc.). Since performing the remedial actions may prevent or reduce the likelihood of the event, the event analysis system may use the machine learning model to determine an updated likelihood of the event after the performance of the remedial action(s). In the event that the updated likelihood for a transaction is determined to be below the predetermined threshold, the event analysis system may release the funds associated with the transaction to the merchant. In some embodiments, the event analysis system may determine whether the event associated with the transaction actually occurred, and may update the machine learning model based on whether the event actually occurred or not.

FIG. 1 illustrates an electronic transaction system 100 according to one embodiment of the disclosure. The electronic transaction system 100 includes a service provider server 130, a merchant server 120, a third-party server 170, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via a website hosted by the merchant server 120 or a point-of-sale (POS) system associated with the merchant server 120. The user 140 may also log in to a user account to access account services or conduct electronic transactions (e.g., account transfers or payments) with the service provider server 130. Similarly, a merchant associated with the merchant server 120 may use the merchant server 120 to log in to a merchant account to access account services (e.g., event analysis services as described herein, etc.) or conduct electronic transactions (e.g., payment transactions) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to conduct electronic transactions (e.g., online payment transactions, etc.) with the merchant server 120 and/or the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location or in an authentication process to determine if a request coming from the user device 110 is fraudulent or valid.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124. In some embodiments, the merchant server 120 may include a data server 128 that is configured to serve content (e.g., web content) to users and interact with users. For example, the data server 128 may include a web server configured to serve web content in response to HTTP requests. In another example, the data server 128 may include an application server configured to provide an interface on user devices (e.g., the user device 110) that has a corresponding application (e.g., a mobile application associated with the merchant) installed. As such, the data server 128 may include pre-generated content ready to be served to users. For example, the data server 128 may store electronic pages associated with different items for sale on the website (or the mobile application) of the merchant server 120 and a frequently asked questions (FAQ) electronic page for providing information (e.g., dispute information) to consumers. In some embodiments, the data server 128 may be disposed in a server separate from the merchant server 120 and may be maintained by an entity different from the merchant (as indicated by the dotted line), for example, the merchant may contract with a third-party host for hosting the website (or the mobile application) of the merchant.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The third-party server 170, in various embodiments, may be maintained by a third-party entity that is not involved in an electronic transaction between the merchant server 120 and the user 140. Examples of such entities include a third-party merchant different from the merchant associated with the merchant server 120, a third-party entity that rates merchants, such as the Best Business Bureau, etc. The third-party server 170 may include an interface (e.g., a web interface generated by a web server, an application programming interface (API), etc.) that enables other parties, such as the user 140 to interact with via the user interface application 112. Even though only one third-party server 170 is shown in FIG. 1, it has been contemplated that one or more third-party servers (each similar to the third-party server 170) associated with different merchants and rating bureaus alike may be communicatively coupled with the merchant server 120, the service provider server 130, and the user device 110 via the network 160 in the system 100.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a data server 134 that is configured to serve content (e.g., web content) to users and interact with users. For example, the data server 134 may include a web server configured to serve web content in response to HTTP requests. In another example, the data server 134 may include an application server configured to interact with a corresponding application (e.g., a service provider mobile application) installed on the user device 110 via one or more protocols (e.g., RESTAPI, SOAP, etc.). As such, the data server 134 may include pre-generated electronic content ready to be served to users. For example, the data server 134 may store a log-in page and is configured to serve the log-in page to users for logging into user accounts of the users to access various service provided by the service provider server 130. The electronic pages may include a page for presenting an event analysis report for the merchant. The data server 134 may also include other electronic pages associated with the different services offered by the service provider server 130. As a result, a user may access a user account associated with the user and access various services offered by the service provider server 130, by generating HTTP requests directed at the service provider server 130.

In some embodiments, the service provider server 130 includes a user tracking module 133 that is configured to monitor user interactions of various users (e.g., the user 140) with one or more interfaces (e.g., websites and/or mobile applications provided by the merchant server 120, websites and/or mobile applications provided by the third-party server 170, and websites and/or mobile applications provided by the service provider server 130, etc.). In some embodiments, the user tracking module 133 may install a program (e.g., a plug-in) on the user device 110 (e.g., within the user interface application 112) for monitoring any interactions of the user 140 with the one or more interfaces via the user interface application 112. The user tracking module 133 may then communicate with the program (e.g., via a push or a pull technique) installed on the user device 110 to obtain user interaction data indicating the user interactions of the user 140 with the one or more interfaces.

In various embodiments, the service provider server 130 includes an event analysis module 132 that implements the event analysis system as discussed herein. The event analysis module 132 is configured to monitor user interactions of consumers with one or more computing systems (including with the merchant server 120 and the service provider server 130) during and/or after a transaction is conducted, and determine a likelihood that an event (e.g., a dispute event, a chargeback event, etc.) associated with the transaction will occur. In some embodiments, the event analysis module 132 may use the user tracking module 133 to monitor the user interactions of the consumers. If the event analysis module 132 determines that the likelihood is above a certain predetermined threshold, the event analysis module 132 may alert the merchant by transmitting a notification to the merchant server 120 and/or perform one or more remedial actions, such as automatically retrieving a shipment status associated with the transaction and transmitting the updated shipment status to the user device 110.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the risk analysis module 132 to classify a request and determine whether to authorize or deny a request associated with the user account. In certain embodiments, account information also includes user purchase profile information such as account funding options and payment options associated with the user, payment information, receipts, and other information collected in response to completed funding and/or payment transactions.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items, which can also be used to determine whether a request is valid or fraudulent.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

Figure 2:
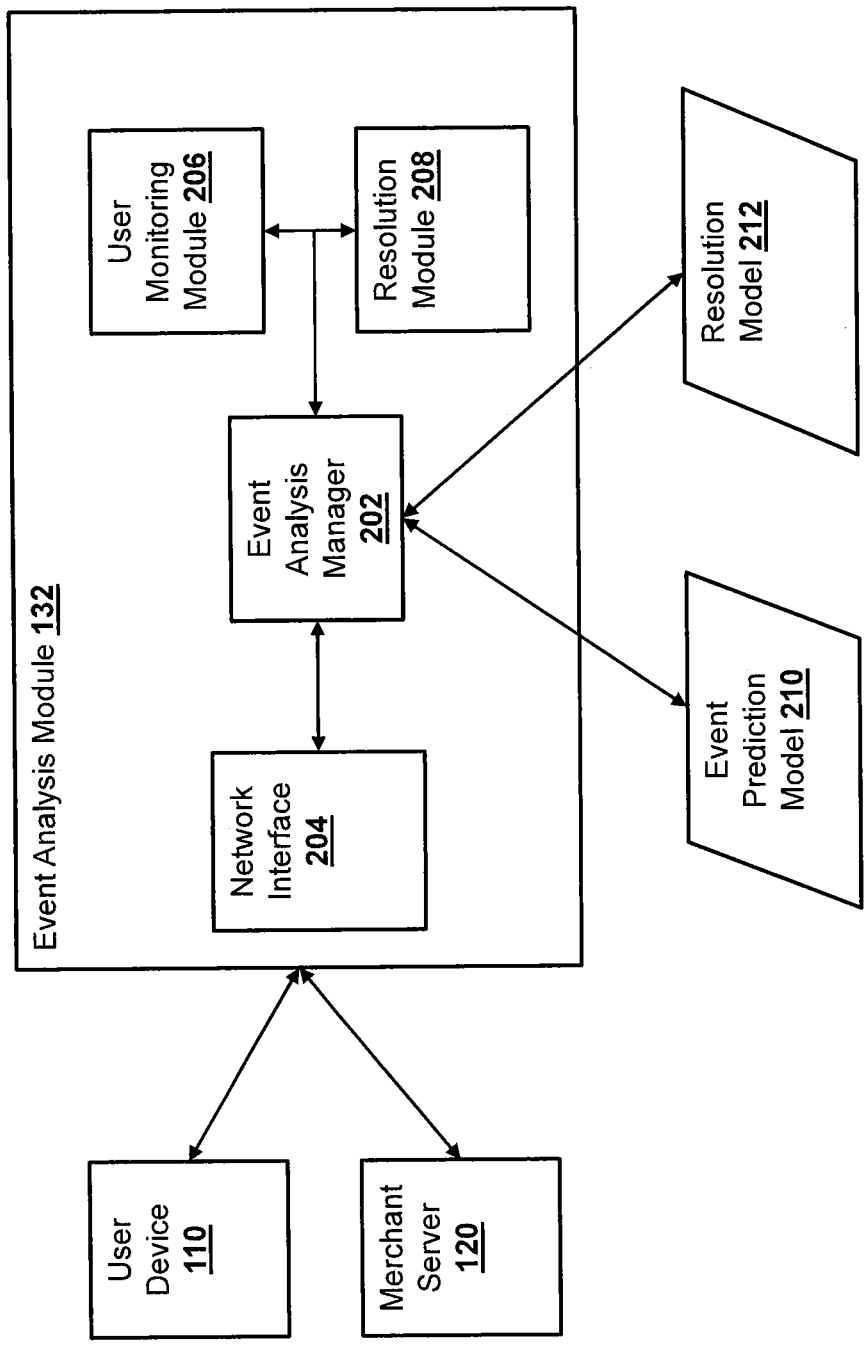
FIG. 2 is a block diagram illustrating an event analysis module according to an embodiment of the present disclosure.

FIG. 2 illustrates a block diagram of the even analysis module 132 according to an embodiment of the disclosure. The risk analysis module 132 includes an event analysis manager 202, a network interface 204 that communicatively couples the event analysis module 132 with user devices (e.g., the user device 110) associated with consumers and merchant servers (e.g., the merchant server 120), a user monitoring module 206, and a resolution module 208. The event analysis manager 202 may receive an indication that a transaction has occurred between the user device 110 and the merchant server 120. For example, a user (e.g., the user 140) may conduct a transaction with a merchant over a website hosted by the merchant server 120 (e.g., purchasing an item from the merchant). The user 140 may choose to pay for the transaction using the payment service provider associated with the service provider server 130. Thus, the event analysis manager 202 may be notified (e.g., by the web server 134) that such a transaction has been conducted between the user 140 and the merchant.

The event analysis manager 202 may obtain information related to the transaction, information related to a shipment of the item, and information related to the user device 110 via the web server 134. The event analysis manager 202 may also use the user monitoring module 206 (or alternatively, the user tracking module 133) to begin monitoring user interactions of the user 140 with one or more computing systems, such as the merchant server 120, the service provider server 130, and other computing systems. The event analysis manager 202 may use the event prediction model 210 to determine a likelihood that an event (e.g., a dispute event, a chargeback event, etc.) associated with the transaction will occur based on the information related to the transaction, information related to a shipment of the item, and information related to the user device 110 via the web server 134 in real time, such that all of the user interactions with the one or more computer system prior to using the event prediction model 210 will be taken into account. When the determined likelihood exceeds a certain threshold (e.g., 60%, 80%, etc.), the resolution module 208 may determine a remedial action. In some embodiments, the resolution module 208 may use the resolution model 212 to determine the remedial action. The remedial action may include one of contacting the user 140, contacting the merchant associated with the merchant server 120, retrieving a shipment status from a courier and transmitting the updated shipment status to the user device 110. The event analysis manager 202 may perform the remedial action. The event analysis manager 202 may also monitor the transaction to determine whether the event has actually occurred, and update the event prediction model 210 based on the determination of whether the event has actually occurred.

Figure 3:
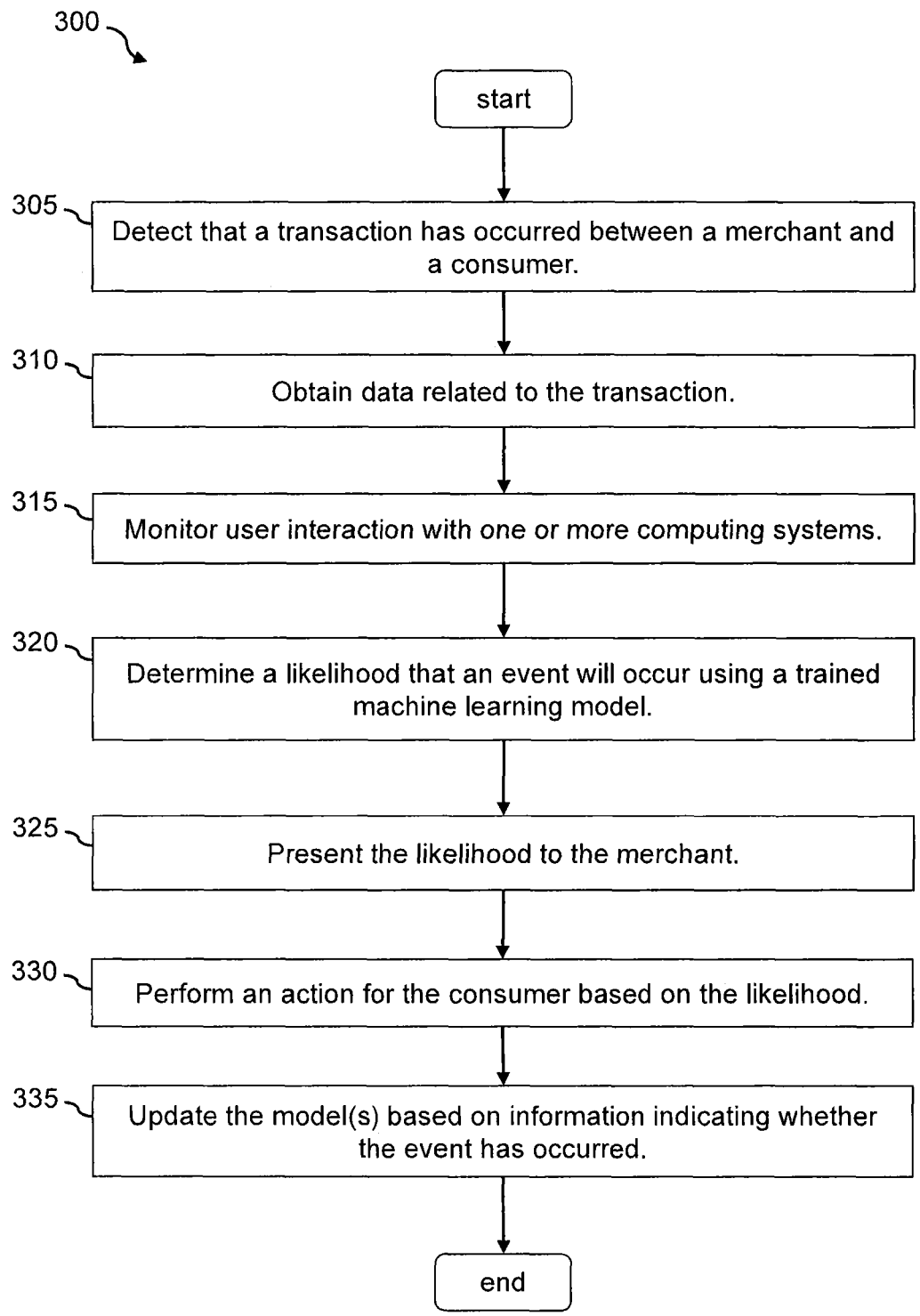
FIG. 3 is a flowchart showing a process of using a machine learning model for predicting an event associated with a transaction according to an embodiment of the present disclosure.

FIG. 3 illustrates a process 300 for using a machine learning model to predict an event associated with a transaction according to an embodiment of the disclosure. In some embodiments, the process 300 may be performed by the event analysis module 132 of the service provider server 130. The process 300 begins by detecting (at step 305) that a transaction has occurred between a merchant and a consumer. For example, a user (e.g., the user 140) may use the user device 110 to conduct a transaction with a merchant over a website hosted by the merchant server 120 or a POS system associated with the merchant server 120. The transaction may involve purchasing of an item from the merchant. The user 140 may choose to pay for the transaction by providing information of a funding source to the merchant or by using the payment service provider associated with the service provider server 130. Thus, either the merchant server 120 and/or the user device 110 may transmit a notification regarding the transaction to the service provider server 130. In some embodiments, in response to detecting the transaction, the event analysis module 132 may hold funds associated with the transaction from the merchant until a release condition is determined (e.g., a settlement of the transaction, a likelihood of an event associated with the transaction is determined to be below a predetermined threshold, etc.). Thus, after the transaction is detected, the event analysis module 132 may use the event prediction model 210 to determine a likelihood of the event one or more times (e.g., periodically during the settlement cycle), such that funds associated with a low-risk transaction may be released to the merchant.

The process 300 then obtains (at step 310) data related to the transaction. For example, in response to detecting that the transaction has occurred between the merchant and the user 140, the event analysis manager 202 may obtain the information related to the transaction that may affect the likelihood of the event associated with the transaction. In some embodiments, the notification that the service provider server 130 receives may include at least some of the information related to the transaction, such as a date and time of the transaction, an identity of the merchant (e.g., in the form of a merchant identifier), an identity of the consumer (e.g., in the form of a consumer identifier), an amount associated with the transaction, a funding source type (e.g., a VISA card, an American Express card, etc.), and an identity of the item associated with the transaction (e.g., in the form of an item identifier such as a universal product code). As such, the event analysis manager 202 may extract some of the information related to the transaction from the notification.

In some embodiments, in addition to the information extracted from the notification, the event analysis manager 202 may also obtain additional information related to the transaction from the account database 136. For example, based on the merchant identifier, the event analysis manager 202 may query the account database 136 for previous transactions associated with the merchant within a predetermined time period (e.g., within the past five years, etc.) and may determine a rate that the event associated the previous transactions has occurred, as the event rate associated with historic transactions that involve the merchant may be an indicator for an event associated with the transaction to occur. Similarly, based on the consumer identifier, the event analysis manager 202 may query the account database 136 for previous transactions associated with the consumer within a predetermined time period (e.g., within the past five years, etc.) and may determine a rate that the event associated the previous transactions has occurred, as the event rate associated with historic transactions that involve the consumer may also be an indicator for an event associated with the transaction to occur.

In addition, the event analysis manager 202 may determine shipment information related to a shipment of the item being purchased by the consumer. For example, the event analysis manager 202 may send a request to the merchant 120 via the network interface 204 for the shipment information, such as whether a shipment creation date, a courier identifier, a tracking number of the shipment, a shipment type (e.g., by air, by ground, etc.), an origin of the shipment, a destination of the shipment, and an expected delivery date of the shipment. Since the merchant may not have created the shipment immediately after the transaction has been conducted, the merchant may respond to the request after the shipment is created. Based on the shipment information, the event analysis manager 202 may also determine a relationship between the transaction and the shipment, such as a lapse of time between the time of the transaction and the time of the shipment creation (e.g., 5 hours, 3 days, etc.), as the lapse of time between the transaction and the shipment may affect the likelihood of the event associated with the transaction.

If the estimated delivery date of the shipment cannot be obtained from the merchant, the event analysis manager 202 may also derive it based on the shipment creation date, the shipment type, the origin of the shipment, and the destination of the shipment based on historical shipments. In some embodiments, once the event analysis manager 202 has received the shipment information from the merchant, such as the courier identifier and the tracking number of the shipment, the event analysis manager 202 may also communicate with a server of the courier to obtain an updated shipment status of the shipment. The event analysis manager 202 may obtain the updated shipment status one or more times (e.g., periodically such as every hour, every day, etc.) after it is determined that the shipment has been created, until a termination condition (e.g., the item has been successfully delivered, the item has been returned, etc.). As the estimated arrival time of the shipment may indicate the likelihood of the event associated with the transaction, the event analysis manager 202 may update the estimated arrival time based on the latest shipment status obtained from the server of the courier. Since the estimated arrival time may change based on the updated shipment status (e.g., item is being held in custom, shipment is delayed due to weather or accident, etc.), the likelihood that the event associated with the transaction may also change over time. As such, in some embodiments, may use the machine learning model to determine the likelihood of the event based on the updated information (e.g., the updated item arrival time, etc.) upon a request for the likelihood and/or multiple times over a time period to determine the likelihood based on updated (or real-time) information.

In some embodiments, the event analysis manager 202 may also retrieve device information of the user device (e.g., the user device 110) used by the consumer (e.g., the user 140) in conducting the transaction. For example, the event analysis manager 202 may retrieve, from the user device 110, information such as a location of the user device 110 when the transaction was conducted, a language used on the device, a device type (e.g., a desktop, a mobile device, etc.), an operating system running on the device, a browser running on the device, and other information that may be obtained from the user device 110. In some embodiments, the event analysis manager 202 may derive a device risk level based on the device information. For example, the risk level of a device (e.g., the user device 110) that is involved with the transaction may be initialized with a zero value, and the event analysis manager 202 may increase the risk level of the user device 110 (e.g., by a predetermined value) when the event analysis manager 202 determines risk indicators that indicates a risk based on the device information. The risk indicators may include an inconsistency between the location of the user device 110 and the language used on the user device 110, a browser type of the browser used to conduct the transaction, an inconsistency between the location of the user device 110 and the destination address of the shipment, etc. The determined risk level of the user device 110 and/or the risk indicators determined for the user device 110 may be provided to the machine learning model for determining the likelihood of the event.

In addition to the information related to the transaction, the shipment, and the device used to conduct the transaction, user interactions of the consumer 140 of the transaction with one or more computing systems, such as the website of the merchant involved in the transaction, the website(s) of other merchant(s), the website of the payment service provider, a website that provides business ratings of various merchants (e.g., Best Business Bureau, etc.), and/or other computing systems may also be indicative to the likelihood of the event associated with the transaction. For example, the consumer 140 visiting a "frequently asked question" page of the merchant website, visiting a transaction detail page associated with the transaction on the merchant website, or conducting an online chat session within the merchant website after conducting the transaction may indicate a higher likelihood that the user may file a dispute with respect to the transaction. Furthermore, the consumer 140 visiting webpages of other merchants (e.g., hosted by the third-party server 170) selling the same or similar item as the item associated with the transaction (e.g., specifically browsing the webpages associated with the same or similar item on the website of another merchant) or the consumer visiting a website for rating merchants (e.g., specifically browsing a webpage that rates the merchant that involved in the transaction, webpages hosted by the third-party server 170, etc.) may indicate a higher likelihood that an event, such as a dispute or a chargeback may take place associated with the transaction. Further yet, the consumer 140 visiting a "frequently asked question" page of the payment service transaction website, visiting a transaction detail page associated with the transaction on the payment service transaction website, or conducting an online chat session within the website of the payment service provider (e.g., specifically discussing the transaction, etc.) shortly after conducting the transaction may indicate a higher likelihood that the user may file a dispute with respect to the transaction.

Figure 4:
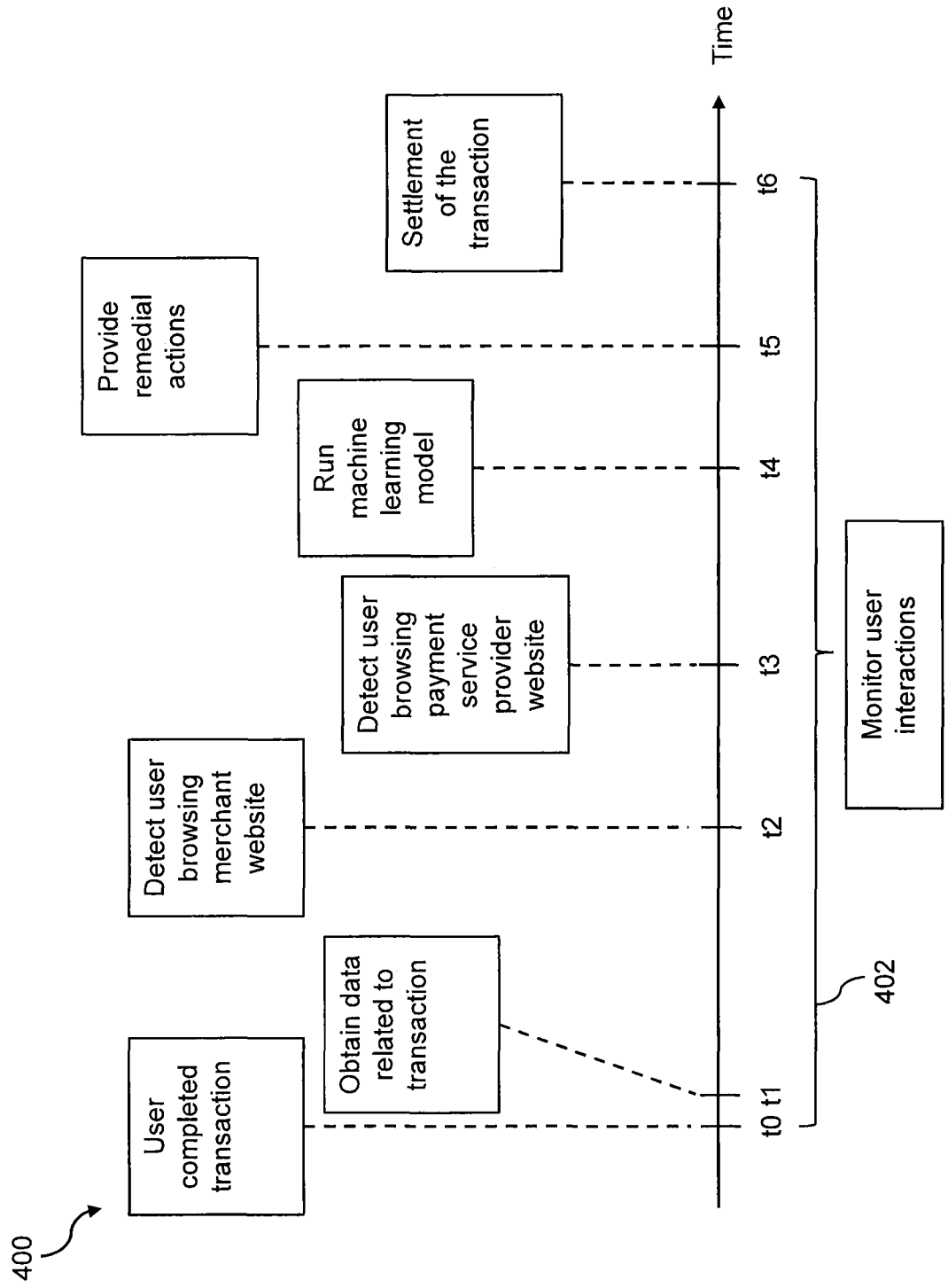
FIG. 4 illustrates a settlement cycle timeline according to an embodiment of the present disclosure.

Thus, referring back to FIG. 3, the process 300 then monitors (at step 315) user interaction(s) of the consumer with one or more computing systems (e.g., websites, mobile applications, etc.) after the transaction has been conducted. For example, in response to detecting that the transaction between the merchant and the consumer 140 has occurred, the event analysis manager 202 may use the user monitoring module 206 (or alternatively the user tracking module 133) to begin monitoring user interactions of the consumer 140 with the one or more computing systems. The user monitoring module 206 (or the user tracking module 133) may monitor user interactions of the consumer 140 for a predetermined duration after the transaction has been conducted (e.g., for five days, ten days, etc.) or until a termination condition is detected (e.g., a settlement of the transaction). FIG. 4 illustrates a timeline 400 representing a settlement cycle of a transaction. As shown, the transaction that involves the merchant and the consumer 140 may occur at time 't0.' However, the transaction (and the payment of the transaction) may not be settled until a later time, such as time 't6.' The duration between the time 'to' and the time 't6' (e.g., the duration 402) represents the settlement cycle and may vary depending on the transaction, and may last from several hours to several weeks. For example, the duration 402 between the time 't0' and the time 't6' for the transaction may be 6 days.

In response to determining that the transaction between the merchant and the consumer 140 has occurred, the event analysis manager 202 may obtain information related to the transaction, information related to a shipment, and/or information related to the user device 110 at time 't1' (e.g., immediately or shortly after the time 't0,' etc.) In addition, the event analysis manager 202 may use the user monitoring module 206 to begin monitoring the user interactions of the consumer 140 with one or more computer systems. In some embodiments, the user monitoring module 206 may be configured to monitor user interactions of the consumer 140 with the one or more computer system during the duration 402 (e.g., between the conducting of the transaction and the settlement of the transaction, etc.).

In some embodiments, the user monitoring module 206 may install a computer program (e.g., a mobile application, a plug-in, etc.) on the user device 110, and may use the computer program running on the user device 110 to obtain information related to the user interactions with the one or more computing systems. For example, the computer program may transmit, to the user monitoring module 206, data indicating the user interactions between the user device 110 and one or more computing systems, such as the interfaces (e.g., websites, mobile applications, etc.) (and electronic pages within the interfaces) accessed by the user interface application 112, a duration that the interfaces (and the pages within the interfaces) are displayed on the user device 110, user interactions performed by the consumer 140 within the interfaces (and the electronic pages) (e.g., engaging in a chat session, clicking on links, etc.). The user monitoring module 206 may pull such data from the computer multiple times over a period (e.g., periodically such as every hour, every day, etc.), and/or the user monitoring module 206 may configure the computer program installed on the user device 110 to push the data to the user monitoring module 206 multiple times over the period (e.g., periodically such as every hour, every day, etc.).

In some embodiments, the event analysis manager 202 may generate a list of computing systems (e.g., websites, mobile applications, etc.) relevant in determining a likelihood of an event associated with the transaction based on the transaction. For example, the list of computing systems may include an interface (e.g., a website, a mobile application, etc.) associated with the merchant involved in the transaction, website(s) of merchant(s) that sell items identical or similar to the item associated with the transaction, an interface (e.g., a website, a mobile application, etc.) of the payment service provider (e.g., the website hosted by the web server 134), and an interface (e.g., a website, a mobile application, etc.) that rates merchants (e.g., the Best Business Bureau website, etc.). When the user monitoring module 206 obtains the user interaction data, the user monitoring module 206 of some embodiments may determine whether any of the computing systems (e.g., websites) accessed by the user device 110 include any one of the predetermined list of computing systems. If the user monitoring module 206 determines that the consumer 140 has accessed a computing system from the list (e.g., browsed any one of the websites, accessed any one of the mobile applications, etc.), the user monitoring module 206 may determine the user interactions of the consumer 140 with the computing system. For example, if it is determined that the consumer 140 has accessed the website of the merchant after conducting the transaction, the user monitoring module 206 may determine a specific webpage within the website (e.g., a FAQ page). The user monitoring module 206 may also determine specific interactions the consumer 140 had on the webpage (e.g., a time that the consumer 140 accessed the webpage, a duration for which the consumer 140 accessed the webpage, a link selected by the consumer 140, a portion of the webpage viewed by the consumer 140, etc.).

In one example, based on the user interaction data, the user monitoring module 206 may determine that the consumer 140 has accessed the FAQ page of the merchant at time 't2' (e.g., twenty-three hours after conducting the transaction), has selected a link in the FAQ page of the merchant correspond to "filing a dispute," and that the consumer 140 has viewed the "filing a dispute" portion of the FAQ page for 15 minutes. Based on the user interaction data, the user monitoring module 206 may also determine that the consumer 140 has accessed a transaction detail page of the payment service provider website at time 't3' (e.g., 24 hours after the conducting of the transaction, etc.), and has viewed the portion of the transaction detail page related to the transaction for 10 minutes.

Referring back to FIG. 3, the process 300 determines (at step 320) a likelihood that an event associated with the transaction will occur using a trained machine learning model, and presents (at step 325) the likelihood to the merchant. For example, the event analysis manager 202 may use a machine learning model (e.g., the event prediction model 210) to determine a likelihood of an event (e.g., a dispute event, a chargeback event, etc.) associated with the transaction any time after the conducting of the transaction. In some embodiments, the event prediction model 210 is a computer-based model (e.g., an artificial neural network) that is trained to determine a likelihood (e.g., a percentage) of an event (e.g., a dispute event, a chargeback event, etc.) associated with a transaction based on a number of input values, such as information related to the transaction, information related to the shipment, information related to a user device involved in the transaction, and information related to the user interactions of a consumer of the transaction with the one or more computer systems. The event prediction model 210 may be trained based on historical transaction data associated with transactions conducted in the past. Each historical transaction data may include data associated with a previously conducted transaction and a label indicated whether an event (e.g., a dispute event, a chargeback event, etc.) associated with the previously conducted transaction has occurred. An example implementation and configuration of the event prediction model 210 is described in more detail below by reference to FIG. 6.

As discussed herein, since the likelihood of the event associated with the transaction may change over time based on factors such as a change in the shipment status or a change of user interactions with the one or more systems, in some embodiments, the event analysis manager 202 may determine a likelihood of the event one or more times over a duration (e.g., the duration 204). For example, the event analysis manager 202 may use the event prediction model 210 to determine the likelihood of the event periodically (e.g., every hour, every 5 hours, every day, etc.). Each time the event analysis manager 202 uses the event prediction model 210 to determine the likelihood, the event analysis manager 202 may access the most updated information, such as the information related to the transaction, the information related to the shipment, the information related to the user device 110, and the information related to the user interactions of the consumer 140 with the one or more computer systems. For example, the event analysis manager 202 may use the event prediction model 210 to determine a likelihood of an event (e.g., a dispute event, a chargeback event, etc.) associated with the transaction at a time 't4.' Before using the event prediction model 210, the event analysis manager 202 may obtain the most updated data (e.g., updated shipment information from a courier server, updated user interaction data from the computer program running on the user device 110, etc.). The event analysis manager 202 may then use the event prediction model 210 to determine a likelihood of the event based on the updated information such that the determined likelihood reflects real-time information of the shipment and the user interaction.

In some embodiments, the service provider server 130 may hold funds from merchants based on the determined likelihood. For example, instead of holding the funds for all pending transaction from the merchants, the service provider server 130 may hold funds only for transactions having a determined likelihood of an event (e.g., a dispute event, a chargeback event, etc.) that exceeds a predetermined threshold (e.g., 60%, 80%, etc.). In the embodiments where funds associated with all transactions are initially held from the merchants immediately after the conducting of the transaction, the event analysis module 132 may release funds associated with transactions that are determined to have a likelihood of an event below the predetermined threshold. As discussed above, not holding all of the funds from merchants, and only funds for transactions that have a high likelihood of a dispute and/or a chargeback, provide benefits to the merchants as it improves the cashflow of the merchants. As a result, the payment service provider will likely receive a higher satisfaction from the merchants as well. In the example illustrated above, it is shown that the event analysis manager uses the event prediction model 210 to determine a likelihood of an event associated with the transaction at the time 't4.' However, in some embodiments, the event analysis manager 202 may determine the likelihood of the event associated with the transaction at any other times (e.g., any time within the duration 402 or even after the settlement of the transaction at the time 't6'). Furthermore, as discussed herein, the event analysis manager 202 may make such a determination multiple times, such as periodically over the duration 402.

In some embodiments, the event analysis manager 202 may also use the event prediction model 210 to determine a likelihood of the event in response to receiving a request, such as a request received from the merchant server 120. For example, the event analysis manager 202 may provide an interface (e.g., a user interface such as a webpage hosted by the web server 134) for a merchant to transmit a request for determining whether an event associated with a transaction will likely occur. In response to receiving such a request, the event analysis manager 202 may obtain the most updated information as described above, and may use the event prediction model 210 based on the updated information to determine a likelihood of an event associated with the transaction. In some embodiments, instead of determining a likelihood of an event associated with a single transaction, the event analysis manager 202 may perform the same process for a set of transactions associated with the merchants (e.g., all pending transactions that have not been settled, etc.). Thus, in response to receiving the request from the merchant server 120, the event analysis manager 202 may query a database (e.g., account database 136) for all pending transactions associated with the merchant associated with the merchant server 120, and may use the event prediction model 210 to determine the likelihood of an event associated with each of the transactions. Furthermore, the event analysis manager 202 may also provide a summary (e.g., a report) for the merchant illustrating the pending transactions.

Figure 5:
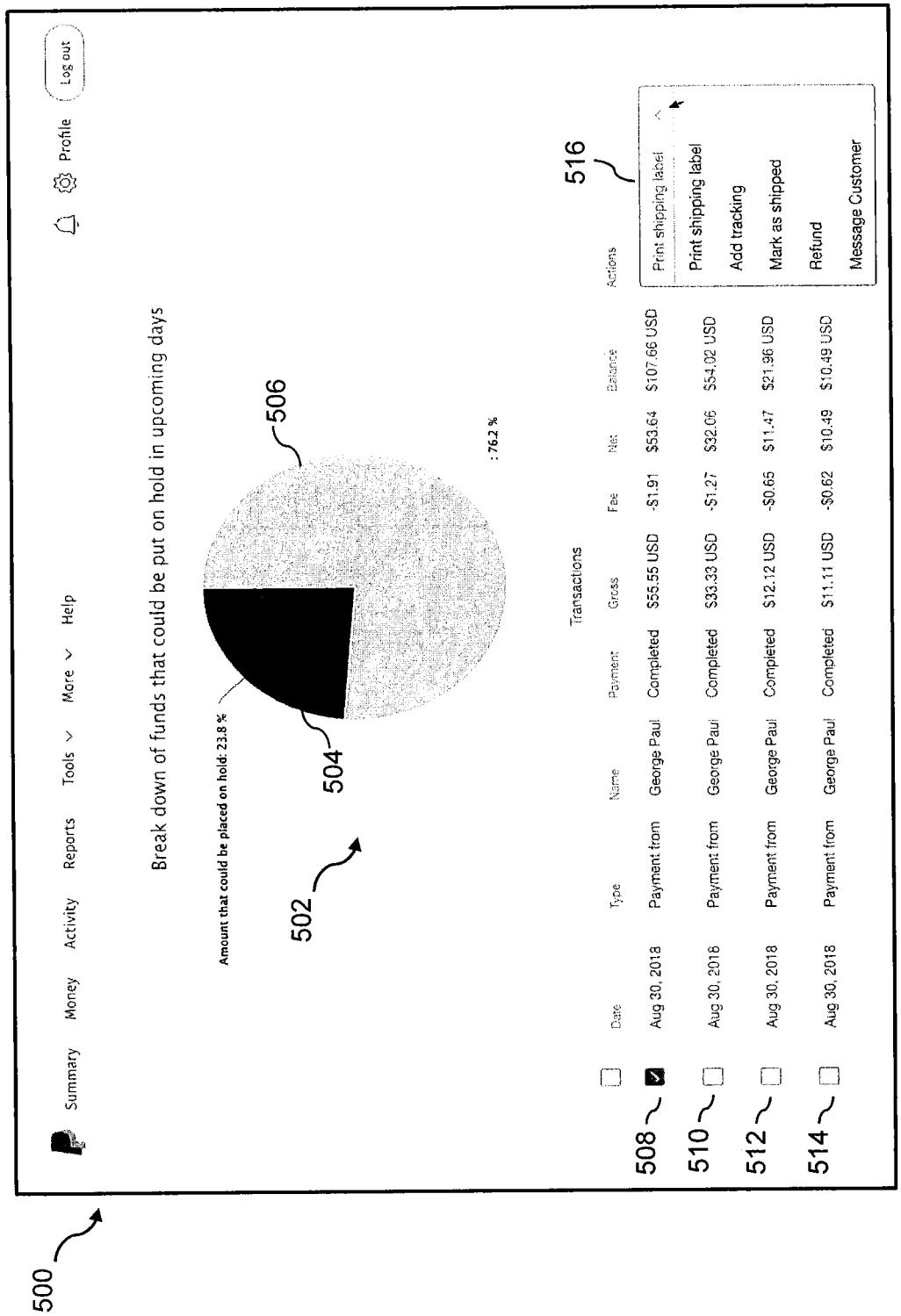
FIG. 5 illustrates an example report interface according to an embodiment of the present disclosure.

FIG. 5 illustrates an example report interface 500 for a merchant. As shown, the report 500 includes a graphical representation 502 representing the pending transactions associated with the merchants. The graphical representation 502 may indicate a size of a portion of the pending transactions with funds being held. In this example, the graphical representation 502 indicates that funds for a portion 504 of the pending transactions may be held from the merchant while funds for the remaining portion 506 of the pending transactions may be released to the merchants. The funds for the portion 504 of the pending transactions may be held from the merchant based on the determined likelihoods of an event (e.g., a dispute event, a chargeback event, etc.) associated with the portion 504 of the pending transactions exceeding the predetermined threshold. In addition to the graphical representation 500, the report interface 500 also presents details of the pending transactions. In some embodiments, the report interface 500 may present the details of the pending transactions corresponding to the portion 504 (funds being held) on the top. As shown, details of four pending transactions 508-514 are presented in the report interface 500. For each of the transactions 508-514, the report interface 500 presents details such as the date of the transaction, a transaction type, a name of the consumer, and an amount of the transaction.

Referring back to FIG. 3, after presenting the likelihood to the merchant, the process 300 performs (at step 330) an action for the consumer based on the likelihood. As such, in addition to the other transaction details, the report interface 500 also includes, for each of the presented transactions 508-514, an action selector, such as a drop-down menu 516, that enables the merchant to select one or more actions to be performed for the associated transaction. As discussed above, the pending transactions 508-514 presented in the report interface 500 may be determined to have a high likelihood of an event (e.g., above a predetermined threshold), and thus funds associated with the pending transactions 508-514 may have been held from the merchants. The actions presented in the action selector 516 may be considered as remedial actions, which if performed for the consumer, may reduce the likelihood of the event from occurring. In this example, the actions that can be selected from the action selector 516 include printing a shipping label (e.g., creating a shipment), adding a tracking feature of the shipment for the consumer, marking the transaction as shipped, refunding the payment to the consumer, and sending a message to the consumer.

In some embodiments, the event analysis manager 202 may monitor a shipment of a transaction (e.g., based on the shipment information received from the merchant). For example, as discussed above, in response to detecting that the transaction between the merchant and the consumer 140 has occurred, the event analysis manager 202 may send to the merchant server 120 a request for shipment information. If no shipment information is received from the merchant server 120 regarding the transaction, the event analysis manager 202 may label the transaction as "shipment not created," which may increase the determined likelihood of the event. When a transaction (e.g., the transaction 508) is labeled as "shipment not created," the event analysis manager 202 may include the option "print shipping label" in the action selector 516 such that the merchant may create a shipment via the report interface 500. If the merchant has actually created a shipment already for the transaction 508, but has not notified the event analysis manager 202, the merchant may select the "mark as shipped" option in the action selector 516 to change the label for the transaction 508, and provides the information (e.g., tracking number, shipment date, destination address, etc.) to the event analysis manager 202 via the report interface 500.

By selecting the "add tracking" option in the action selector 516 for the transaction 508, the event analysis manager 202 may automatically monitor the shipment status of a shipment related to the transaction 508 and transmits updated shipment status (e.g., periodically) to the consumer 140 via the user device 110. For example, the event analysis manager 202 may report to the consumer 140 each time the item has reportedly arrived at a new location (e.g., a new courier facility, etc.).

The merchant may also select the "refund" option in the action selector 516, for example, when the merchant determines that the transaction can no longer be fulfilled (e.g., out of stock, etc.) or when the merchant determines that the transaction is a fraudulent transaction not authorized by the consumer 140. Lastly, the merchant may also select the "message customer" option in the action selector 516. When the option "message customer" is selected, the report interface may provide an additional interface for the merchant to draft a message to be sent to the consumer associated with the transaction 508. The event analysis manager 202 may then transmit the drafted message to the consumer.

Performing one or more of the actions selectable in the action selector 516 may change the information associated with the transaction (e.g., the shipment status, the payment status, etc.) and as a result may affect the likelihood of the event associated with the transaction. As such, after performing an action for the transaction, the event analysis manager 202 may update the likelihood based on the new status after performing the selected action(s) (e.g., by using the event prediction model 210 to determine the likelihood of the event associated with the transaction based on the new information). In some cases, performing the action(s) may lower the likelihood of the event sufficiently to bring the likelihood below the predetermined threshold. As a result, the event analysis manager 202 may release the funds associated with the transaction (e.g., the transaction 508) based on the newly determined likelihood.

In some embodiments, the event analysis manager 202 may perform one or more of the remedial actions without requiring an input from the merchant. For example, in response to determining that the likelihood of an event associated with the transaction is above the predetermined threshold, the event analysis manager 202 may perform at least one of the remedial actions (e.g., retrieving an updated shipment status and providing the updated shipment status to the consumer 140 via the user device 110). In some embodiments, the event analysis manager 202 may use a computer-based machine learning model (e.g., a resolution model 212) to determine an optimal remedial action to perform for a transaction. The computer-based machine learning model (e.g., resolution model 212) may be trained using data associated with historical transactions. The data for each historical transaction may include transaction data (such as the information of the transaction, the information of the shipment, the information of the user device, user interaction information, etc.), a remedial action that has been performed, and whether an event (e.g., a dispute event, a chargeback event, etc.) has occurred. Thus, the resolution model 212 may be trained and configured to provide, based on the information associated with a transaction, a remedial action that will most likely prevent the event from occurring. The event analysis manager 202 may then perform the action recommended by the resolution model 212.

In some embodiments, after performing a remedial action for the transaction (e.g., sending a shipment status update to the user device 110, etc.), the event analysis manager 202 may continue to monitor the user interactions of the consumer 140 with the one or more computing systems for a period of time. The event analysis manager 202 may then determine a new likelihood of the event based on the updated status (after performing the remedial action) and the user interaction data obtained based on the user interactions of the consumer 140 with the one or more computer systems after the remedial action has been performed. If the newly determined likelihood is lower than the predetermined threshold, the event analysis manager 202 may release the funds associated with the transaction to the merchant associated with the merchant server 120.

The event analysis manager 202 may continue to monitor the transaction to detect an occurrence of the event. In some embodiments, the event analysis manager 202 may monitor the transaction for a predetermined period of time (e.g., between the conducting of the transaction and the settlement of the transaction, within a fixed period of time such as 5 days after the conducting of the transaction, etc.). In some embodiments, the period of time may be dynamically determined based on the user interactions detected of the user 140 with the one or more computing systems. For example, the event analysis manager 202 may determine an initial period of time (e.g., 5 days, until the settlement, etc.). However, based on the user interactions of the user 140 with the one or more computing systems that increase the likelihood of the event are detected (or based on the determined likelihood of the event), the event analysis manager 202 may extend the period of time (e.g., extend by an additional period such as one hour or one day with each increase, such as 5% increase, of the likelihood of the event, etc.). If the event is detected (or if the event is not detected after a predetermined period of time, such as after the settlement of the transaction, etc.), the event analysis manager 202 may use the information to update the event prediction model 210 and/or the resolution model 212. As such, the process 300 updates (at step 335) the model(s) based on information indicating whether the event has occurred for the transaction.

Figure 6:
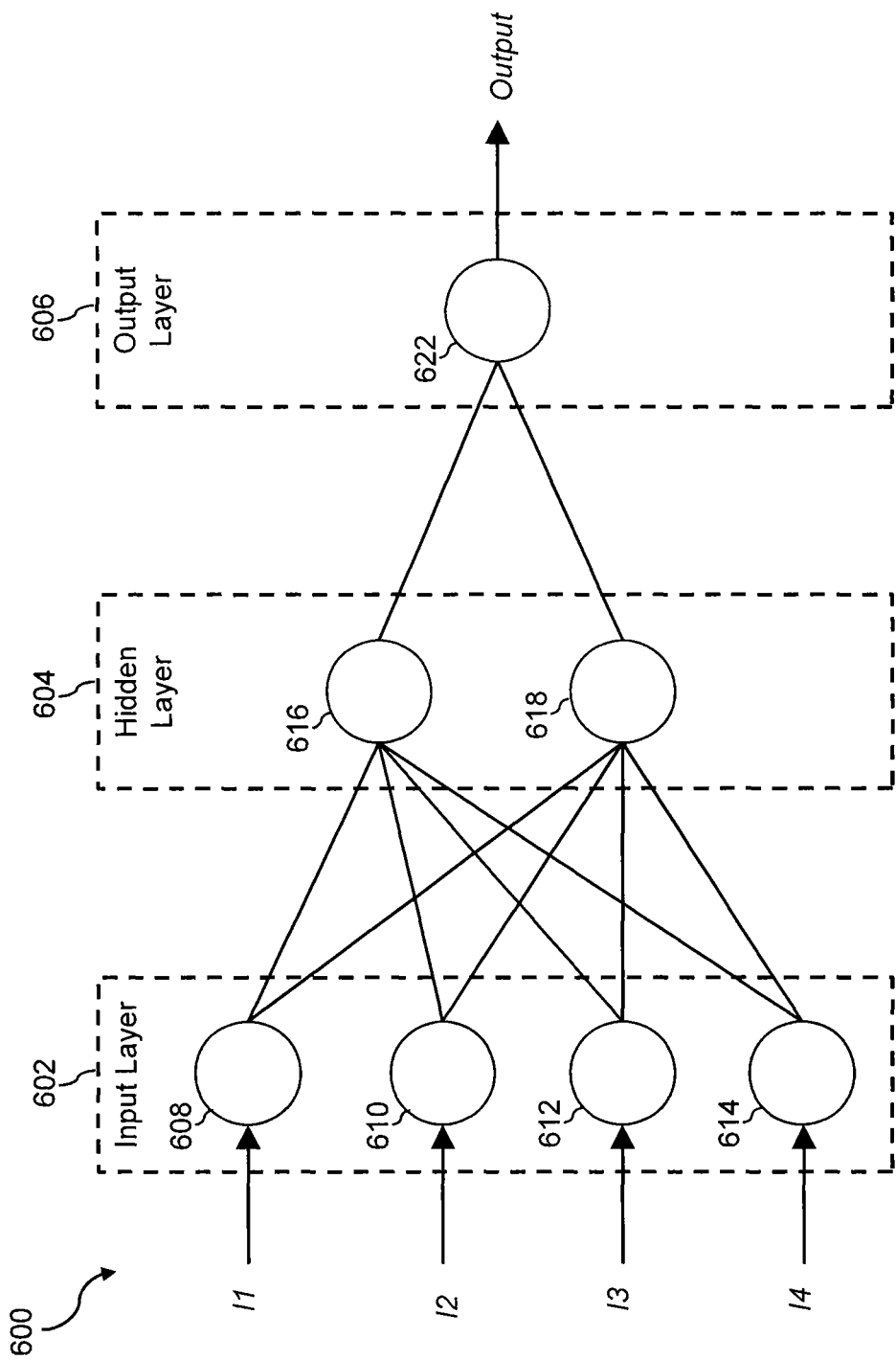
FIG. 6 illustrates another exemplary artificial neural network according to an embodiment of the present disclosure.

FIG. 6 illustrates an example artificial neural network 600 that may be used to implement the event prediction model 210 and/or the resolution model 212. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the event prediction module 210 and/or the resolution model 212 may include as many hidden layers as necessary.

In this example, the artificial neural network 600 receives a set of input values and produces an output value. Each node in the input layer 602 may correspond to a distinct input value. For example, when the artificial neural network 600 is used to implement the event prediction model 210 and/or the resolution model 212, each node in the input layer 602 may correspond to a distinct attribute of a transaction. In a non-limiting example, the node 608 may correspond to a transaction amount, the node 610 may correspond to whether a location of the user device used in conducting the transaction is consistent with a language used in the user device, the node 612 may correspond to a shipment status, the node 614 may correspond to whether a merchant website has been visited by the consumer after the transaction is conducted, and so forth.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the event prediction model 210, the output value produced by the artificial neural network 600 may indicate a likelihood of an event (e.g., a dispute event, a chargeback event, etc.) associated with the transaction. When the artificial neural network 600 is used to implement the resolution model 212, the output value produced by the artificial neural network 600 may indicate one of a plurality of remedial actions recommended for the transaction.

The artificial neural network 600 may be trained by using training data. By providing training data to the artificial neural network 600, the nodes 616-618 in the hidden layer 604 may be trained (adjusted) such that an optimal output (e.g., a classification) is produced in the output layer 606 based on the training data. By continuously providing different sets of training data, and penalizing the artificial neural network 600 when the output of the artificial neural network 600 is incorrect (e.g., when the determined (predicted) likelihood is inconsistent with whether the event actually occurred for the transaction, when the event associated with the transaction still occurred after performing the recommended remedial action, etc.), the artificial neural network 600 (and specifically, the representations of the nodes in the hidden layer 604) may be trained (adjusted) to improve its performance in data classification. Adjusting the artificial neural network 600 may include adjusting the weights associated with each node in the hidden layer 504.

Figure 7:
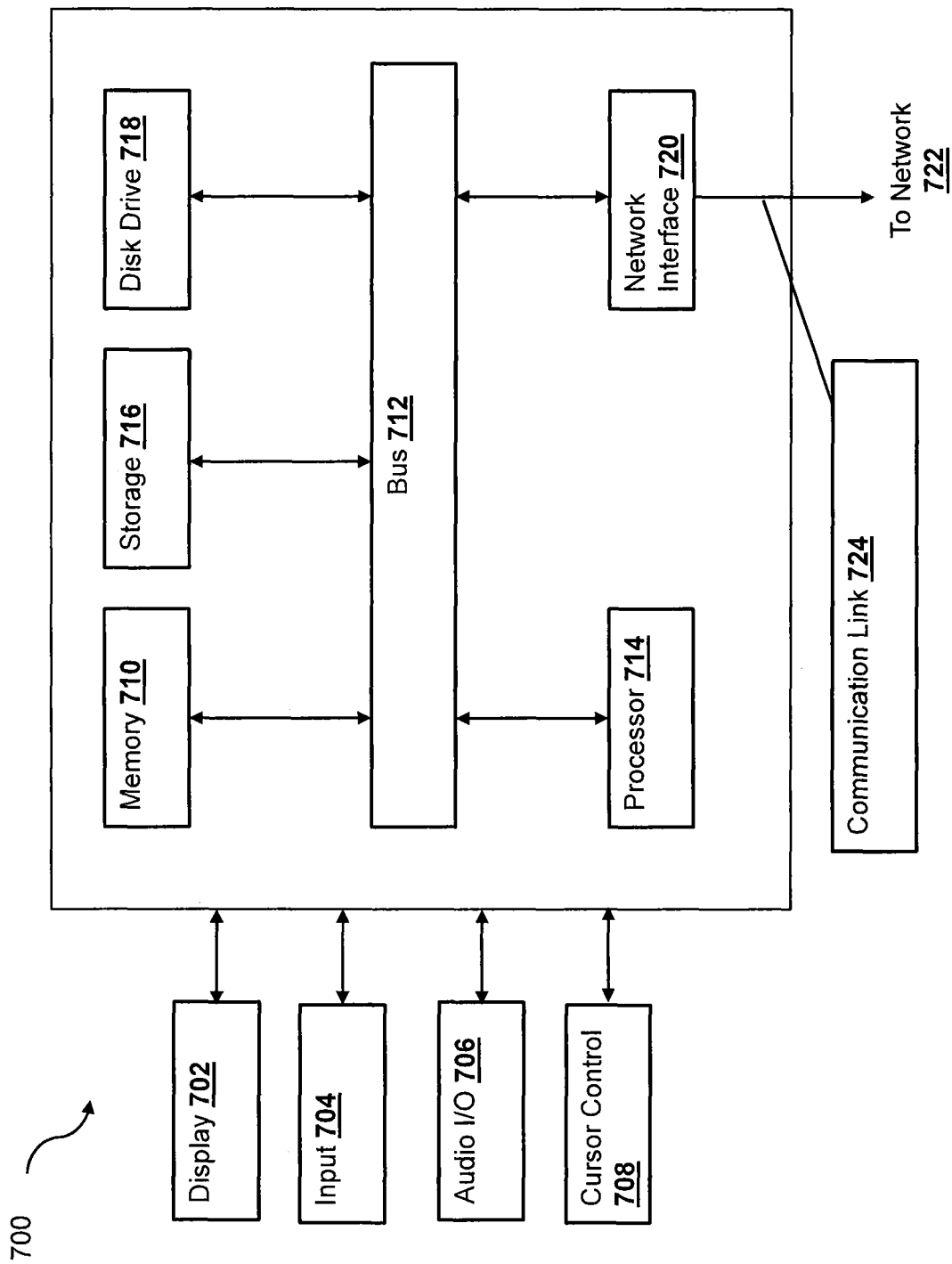
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the event prediction functionalities described herein according to the process 300.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving an indication that a transaction has occurred between a user and a merchant, wherein the transaction comprises a purchase of an item from the merchant;
monitoring interactions of the user with one or more computing systems over a period of time after the receiving of the indication;
determining, using a machine learning model based on the monitored interactions, a likelihood that an event will be associated with the transaction, wherein the event comprises at least one of a dispute event or a chargeback event;
determining an action associated with the event;
determining the likelihood is higher than a predetermined threshold;
performing the action for the user based on the likelihood being higher than the predetermined threshold;
determining whether the event associated with the transaction has occurred; and
training the machine learning model based on information indicating whether the event associated with the transaction has occurred.

2. The system of claim 1, wherein the period of time is between the receiving of the indication and a settlement of the transaction.

3. The system of claim 1, wherein the transaction occurred over a merchant interface associated with the merchant, wherein the monitoring the interactions comprises determining whether the user has browsed a particular page within the merchant interface during the period of time.

4. The system of claim 1, wherein the merchant is a first merchant, wherein the transaction occurred over a first merchant interface associated with the first merchant, wherein the monitoring the interactions comprises monitoring interactions of the user with a second interface associated with a second merchant during the period of time.

5. The system of claim 1, wherein the performing the action comprises:
determining a shipment status related to shipping the item to the user; and
transmitting the shipment status to a device associated with the user.

6. The system of claim 1, wherein the operations further comprise transmitting the likelihood to a device associated with the merchant.

7. The system of claim 1, wherein the operations further comprise:
determining an elapsed amount of time between the receiving the indication and a shipment of the item, wherein the likelihood is determined further based on the elapsed amount of time.

8. The system of claim 1, wherein the event comprises a chargeback event.

9. A method, comprising:
receiving an indication that a transaction has occurred between a user and a merchant, wherein the transaction comprises a purchase of an item from the merchant;
monitoring first user interactions of the user with one or more computing systems over a first period of time after receiving the indication;
determining, by using a machine learning model based on the first user interactions, a first likelihood that a dispute event or a chargeback event associated with the transaction will occur;
withholding funds associated with the transaction from the merchant based on the first likelihood;

performing a remedial action for the user in response to the determining;

determining a second likelihood that the dispute event or the chargeback event associated with the transaction will occur by using the machine learning model based on information obtained after the remedial action is performed;

in response to determining that the second likelihood is below a predetermined threshold, releasing the funds to the merchant;

determining whether the dispute event or the chargeback event associated with the transaction has occurred; and training the machine learning model based on information indicating whether the dispute event or the chargeback event associated with the transaction has occurred.

10. The method of claim 9, further comprising monitoring second user interactions of the user with the one or more computing systems over a second period of time after performing the remedial action, wherein the second likelihood is determined by using the machine learning model based on the monitored second user interactions.

11. The method of claim 9, wherein the performing the remedial action comprises:

retrieving a shipment status from a server associated with a courier; and transmitting the shipment status to a user device associated with the user.

12. The method of claim 9, further comprise providing a user interface to the merchant, wherein the user interface indicates that the funds associated with the transaction is withheld and includes an action selector that enables the merchant to select an action from a list of remedial actions, and wherein the remedial action is performed based on a selection by the merchant.

13. A non-transitory machine-readable medium having stored thereon machine-readable instructions executable to cause a machine to perform operations comprising:

receiving an indication that a transaction has occurred between a user and a merchant, wherein the transaction comprises a purchase of an item from the merchant;

monitoring interactions of the user with one or more computing systems over a period of time after the receiving of the indication;

determining, using a machine learning model based on the monitored interactions, a likelihood that an event will be associated with the transaction, wherein the event comprises at least one of a dispute event or a chargeback event;

in response to determining that the likelihood is higher than a predetermined threshold, performing an action for the user;

determining whether the event associated with the transaction has occurred; and training the machine learning model based on information indicating whether the event associated with the transaction has occurred.

14. The non-transitory machine-readable medium of claim 13, wherein the interactions are monitored during the period of time between the receiving of the indication and a settlement of the transaction.

15. The non-transitory machine-readable medium of claim 13, wherein the transaction occurred over a merchant interface associated with the merchant, wherein the monitoring the interactions comprises determining whether the user has browsed a particular page within the merchant interface during the period of time.

16. The non-transitory machine-readable medium of claim 13, wherein the merchant is a first merchant, wherein the transaction occurred over a first merchant interface associated with the first merchant, wherein the monitoring the interactions comprises monitoring interactions of the user with a second interface associated with a second merchant during the period of time.

17. The non-transitory machine-readable medium of claim 13, wherein the performing the action comprises:

determining a shipment status related to shipping the item to the user; and transmitting the shipment status to a device associated with the user.

18. The non-transitory machine-readable medium of claim 13, wherein the operations further comprise transmitting the likelihood to a device associated with the merchant.

19. The non-transitory machine-readable medium of claim 13, wherein the operations further comprise:

determining an elapsed amount of time between the receiving of the indication and a shipment of the item, wherein the likelihood is determined further based on the elapsed amount of time.

20. The non-transitory machine-readable medium of claim 13, wherein the event comprises a transaction dispute event.

* * * * *